US007748610B2

(12) United States Patent
Bell et al.

(10) Patent No.: US 7,748,610 B2
(45) Date of Patent: Jul. 6, 2010

(54) PACKAGING DEVICE AND CONTAINER FOR SHEET OBJECTS

(75) Inventors: Malcolm Bell, Leeds (GB); Les Hutton, Rochdale (GB)

(73) Assignee: Money Controls Limited, Royton Oldham (GB)

( * ) Notice: Subject to any disclaimer, the term of this patent is extended or adjusted under 35 U.S.C. 154(b) by 509 days.

(21) Appl. No.: 10/580,759

(22) PCT Filed: Nov. 26, 2004

(86) PCT No.: PCT/GB2004/005007

§ 371 (c)(1), (2), (4) Date: May 26, 2006

(87) PCT Pub. No.: WO2005/055159

PCT Pub. Date: Jun. 16, 2005

(65) Prior Publication Data

US 2007/0112459 A1 May 17, 2007

(30) Foreign Application Priority Data

Nov. 26, 2003 (GB) ................................ 0327522.9

(51) Int. Cl.
*G06Q 40/00* (2006.01)
*G07D 11/00* (2006.01)
*G07F 19/00* (2006.01)

(52) U.S. Cl. ....................... 235/379; 235/385; 235/375; 235/384

(58) Field of Classification Search ................. 235/379, 235/380, 385, 487, 375, 384; 340/572.1
See application file for complete search history.

(56) References Cited

U.S. PATENT DOCUMENTS

| | | | | |
|---|---|---|---|---|
| 5,904,263 | A * | 5/1999 | St. Pierre et al. | 220/23.4 |
| 6,402,025 | B1 | 6/2002 | Shepherd et al. | |
| 6,502,746 | B1 * | 1/2003 | Do et al. | 235/379 |
| 6,575,300 | B2 * | 6/2003 | Meyer et al. | 206/554 |
| 6,737,974 | B2 * | 5/2004 | Dickinson | 340/572.8 |
| 6,943,678 | B2 * | 9/2005 | Muirhead | 340/505 |
| 2001/0049629 | A1 * | 12/2001 | Freeman | 705/23 |
| 2002/0130778 | A1 | 9/2002 | Nicholson | |
| 2004/0021570 | A1 * | 2/2004 | Maloney | 340/568.1 |
| 2004/0182740 | A1 * | 9/2004 | Lechelle | 206/557 |
| 2004/0233065 | A1 * | 11/2004 | Freeman | 340/825.49 |
| 2005/0116032 | A1 * | 6/2005 | Tripp et al. | 235/384 |
| 2005/0242957 | A1 * | 11/2005 | Lindsay et al. | 340/572.7 |
| 2006/0077059 | A1 * | 4/2006 | Sako et al. | 340/572.1 |
| 2008/0223930 | A1 * | 9/2008 | Rolland et al. | 235/385 |

FOREIGN PATENT DOCUMENTS

| | | |
|---|---|---|
| DE | 3931176 | 3/1991 |
| EP | 0852279 | 7/1998 |

(Continued)

*Primary Examiner*—Edwyn Labaze
(74) *Attorney, Agent, or Firm*—Orrick Herrington & Sutcliffe, LLP

(57) ABSTRACT

This invention relates to a packaging device (1) for packaging a stack of sheet objects that have an attributable monetary value in a container (4), the device (1) comprising means (34, 35) for determining value data relating to the monetary value attributed to a sheet object to be stacked in the container (4), and an RF reader/writer (52) for writing said value data to an RFID device (21) associated with the container (4).

23 Claims, 19 Drawing Sheets

FOREIGN PATENT DOCUMENTS

| | | |
|---|---|---|
| EP | 1031949 | 8/2000 |
| EP | 1189106 | 3/2002 |
| EP | 1258842 | 11/2002 |
| GB | 2236143 | 3/1991 |
| WO | 94/17274 | 8/1998 |
| WO | 01/91065 | 11/2002 |

* cited by examiner

PACKAGING DEVICE AND CONTAINER FOR SHEET OBJECTS

RELATED APPLICATIONS

The present invention claims all rights of priority to PCT International Application No. PCT/GB2004/005007, filed on Nov. 26, 2004 and United Kingdom Application No. GB 0327522.9, filed on Nov. 26, 2003, both of which are hereby incorporated by reference.

FIELD OF THE INVENTION

The present invention relates to the packaging of sheet objects that have an attributable monetary value, for example paper money such as banknotes or like promissory notes.

BACKGROUND OF THE INVENTION

Hitherto, banknotes have been counted in note counting machines and wrapped in stacks with paper bands. Also, vacuum packing machines have been used to pack stacks of banknotes in airtight bags that are evacuated of air and sealed. Banknotes packaged in this way can be transported readily without the risk of the individual stacks being pilfered. However vacuum packing machines are expensive and normally used only for processing large volumes of banknotes.

For smaller volume applications, for example in retail operations, devices such as our WACS 5 (World Acceptor Cassette System) note bill and bar coded ticket/coupon acceptor may be used, which has a cassette stacking system. The cassette comprises a metal box that receives validated bank notes or the like from a note acceptor. The cassette can store of the order of 500 street-grade banknotes. The cassette may be removed by an operator and taken to a secure location where it is unloaded, for onward transmission of the banknotes e.g. to a bank. A problem with the conventional cassette is that the progress of an individual cassette, during its journey from a POS (Point of Sale) terminal to the bank or counting centre, cannot be readily monitored. Thus, if a cassette is lost or stolen after being removed from a POS terminal, the loss or theft may not be readily apparent and it may be difficult to determine the point at which the loss or theft occurred.

Another problem with the cassette system is that it can be opened during transport and runs the risk of pilfering. Furthermore, the cassette provides no ready indication that it has been opened and that pilfering may have occurred.

SUMMARY OF THE INVENTION

According to one aspect of the present invention, there is provided a packaging device for packaging a stack of sheet objects that have an attributable monetary value in a container, the device comprising:

means for determining value data relating to a sheet object to be stacked in the container; and an RF reader/writer for writing said value data to an RFID device associated with the container.

The value data may relate to the monetary value attributed to said sheet object and/or the position of said sheet object within said stack.

The device may comprise a sealing device for sealing the container with an RFID device therein.

According to another aspect of the present invention, there is provided a packaging system for packaging a stack of sheet objects that have an attributable monetary value in a container, comprising (i) a packaging device, comprising:

means for determining first value data relating to a sheet object to be stacked in the container; and an RF reader/writer for writing said first value data to an RFID device, (ii) at least one container configured to be filled with a stack of sheet objects by the packaging device, (iii) an RFID device associated with the container.

According to yet another aspect of the present invention, there is provided a method of transporting sheet objects that have an attributable monetary value, the method comprising:

determining first value data relating to a stack of sheet objects packaged in a container; and writing said first value data to an RFID device associated with the container.

According to still another aspect of the present invention, there is provided a packaging device for packaging a stack of sheet objects that have an attributable monetary value in a container, the device comprising:

means for determining value data relating to a sheet object to be stacked in the container; and an RF reader for reading identification information from an RFID device associated with the container.

According to yet another aspect of the present invention, there is provided a packaging system for packaging a stack of sheet objects that have an attributable monetary value in a container, comprising (i) a packaging device, comprising:

means for determining first value data relating to a sheet object to be stacked in the container; and an RF reader for reading identification information from an RFID device associated with a container, (ii) at least one container configured to be filled with a stack of sheet objects by the packaging device, (iii) an RFID device associated with the container, (iv) first processing means having a first database for storing identification information read from the RFID device in association with said first value data.

According to yet another aspect of the present invention, there is provided a method of transporting sheet objects that have an attributable monetary value, the method comprising:

determining first value data relating to a stack of sheet objects packaged in a container;

reading identification information from an RFID device associated with the container;

storing said identification information in a first database in association with said first value data.

According to still another aspect of the present invention, there is provided a container suitable for having a stack of sheet objects having an attributable monetary value packaged therein and an RFID device associated with the container.

Preferably, the container comprises a closure member sealing the RFID device inside the container.

The RFID device may be a read/write RFID tag or a read-only RFID tag.

BRIEF DESCRIPTION OF THE DRAWINGS

Embodiments of the present invention will now be described, by way of example, with reference to the accompanying drawings, in which.

DETAILED DESCRIPTION

Figure 1:
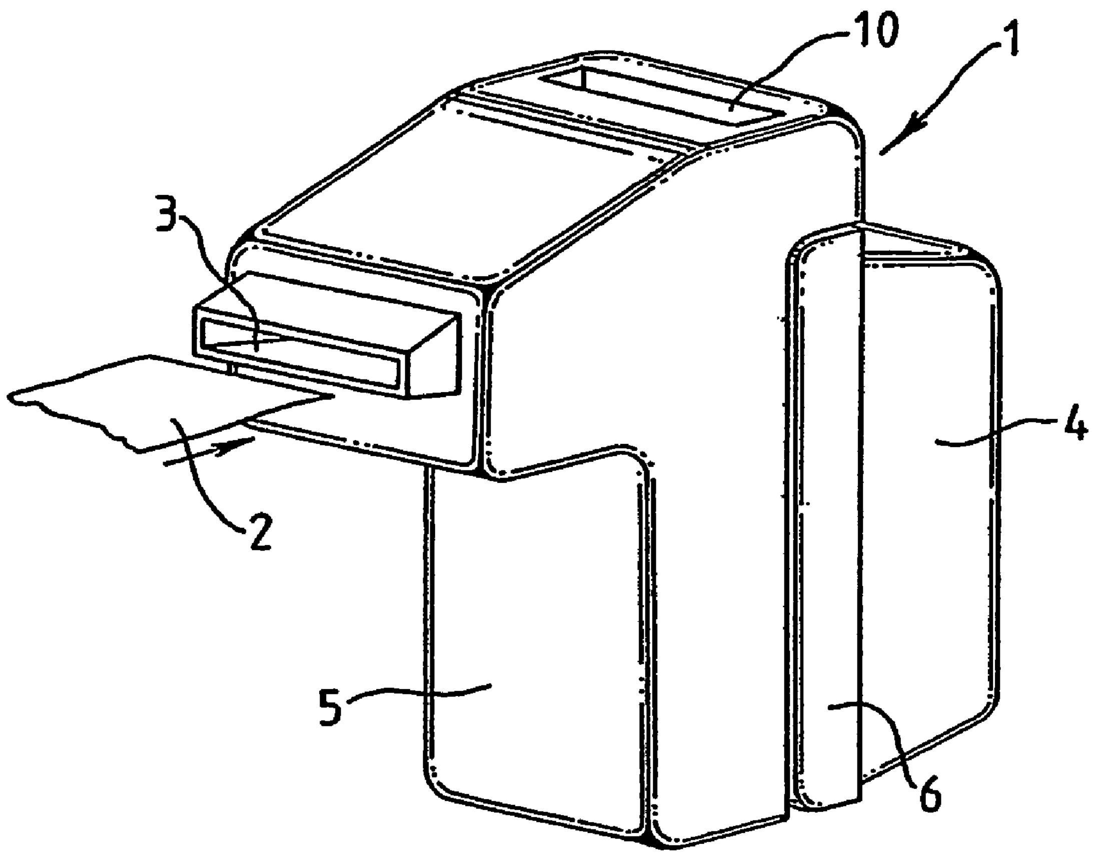
FIG. 1 is a schematic perspective view of a packaging device and associated single use container in accordance with the invention, in a closed configuration with the container fitted ready for use.

The example of the invention illustrated in the drawings is for packaging banknotes and as used herein, the term "banknote" means a promissory note especially from a central bank or other governmental organisation payable to the bearer on demand for use as money, also known as "paper money" and in the USA as "currency" or a "bill".

Referring to FIG. 1, a packaging device 1 is configured to receive individual banknotes 2 through an input slot 3 and stack them in a removable container 4. The packing device 1 may be mounted at a point of sale in a retail outlet, for example at a checkout in a supermarket so that banknotes can be packaged in the container 4 and then transported securely to a remote location, such as a cashier's office.

The packaging device 1 comprises a main body 5 and a frame 6 mounted on the main body 5 to receive the container 4. The frame 6 is hinged on the main body 5 in this example, so that it can be moved between a closed position shown in FIG. 1 to an open position shown in FIG. 2, to act as a docking mechanism that allows the container 4 to be inserted and removed between the frame 6 and the main body 5. The container 4 is generally rectangular in configuration to be described in more detail hereinafter, with a peripheral lip 7. The frame 6 defines an output port 8 through which the container 4 protrudes as shown in FIG. 1, with its lip 7 sandwiched between the main body 5 and the frame 6.

Figure 2:
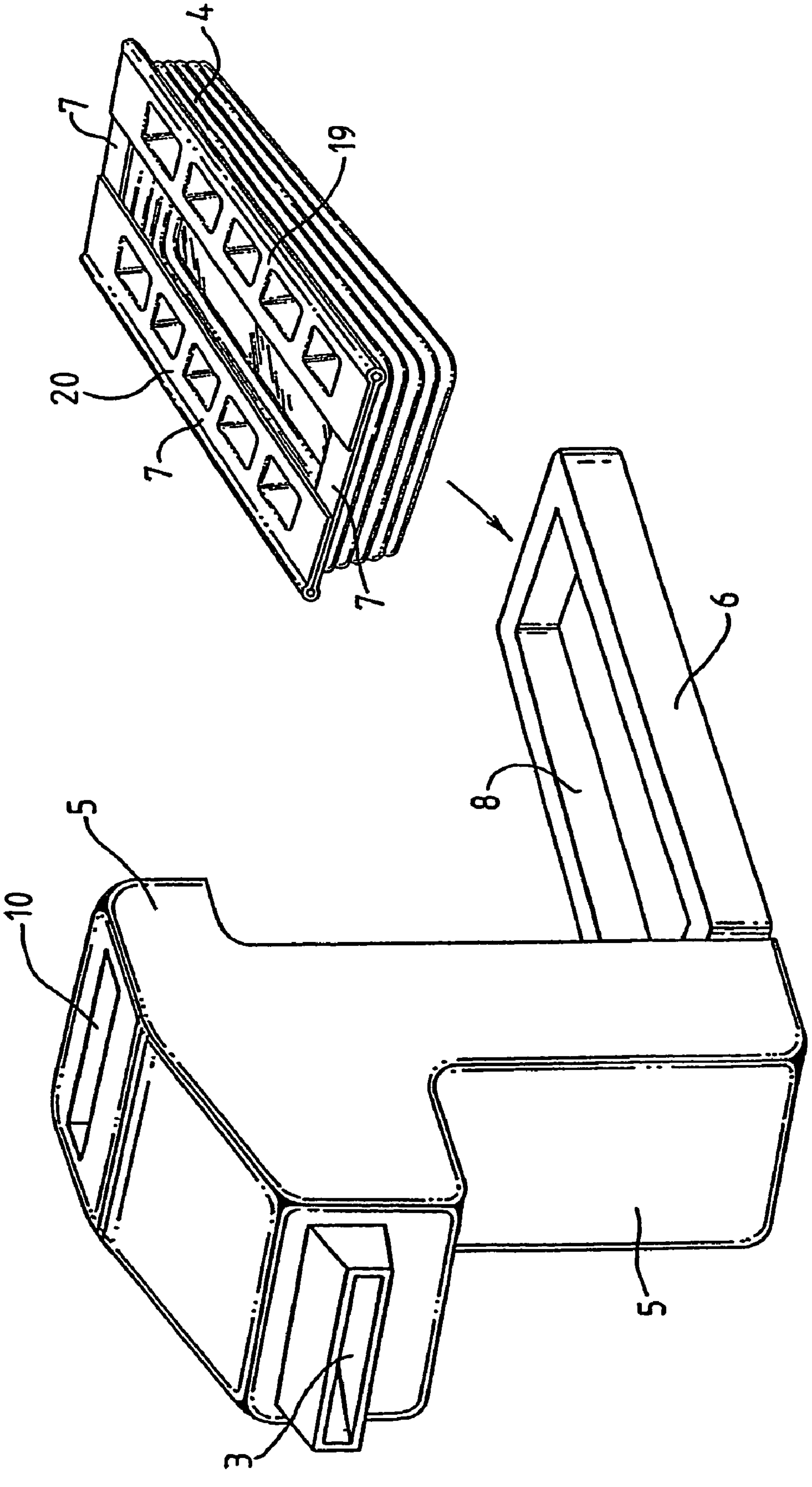
FIG. 2 corresponds to the view of FIG. 1 but with the device open to receive the container, prior to use.
Figure 3:
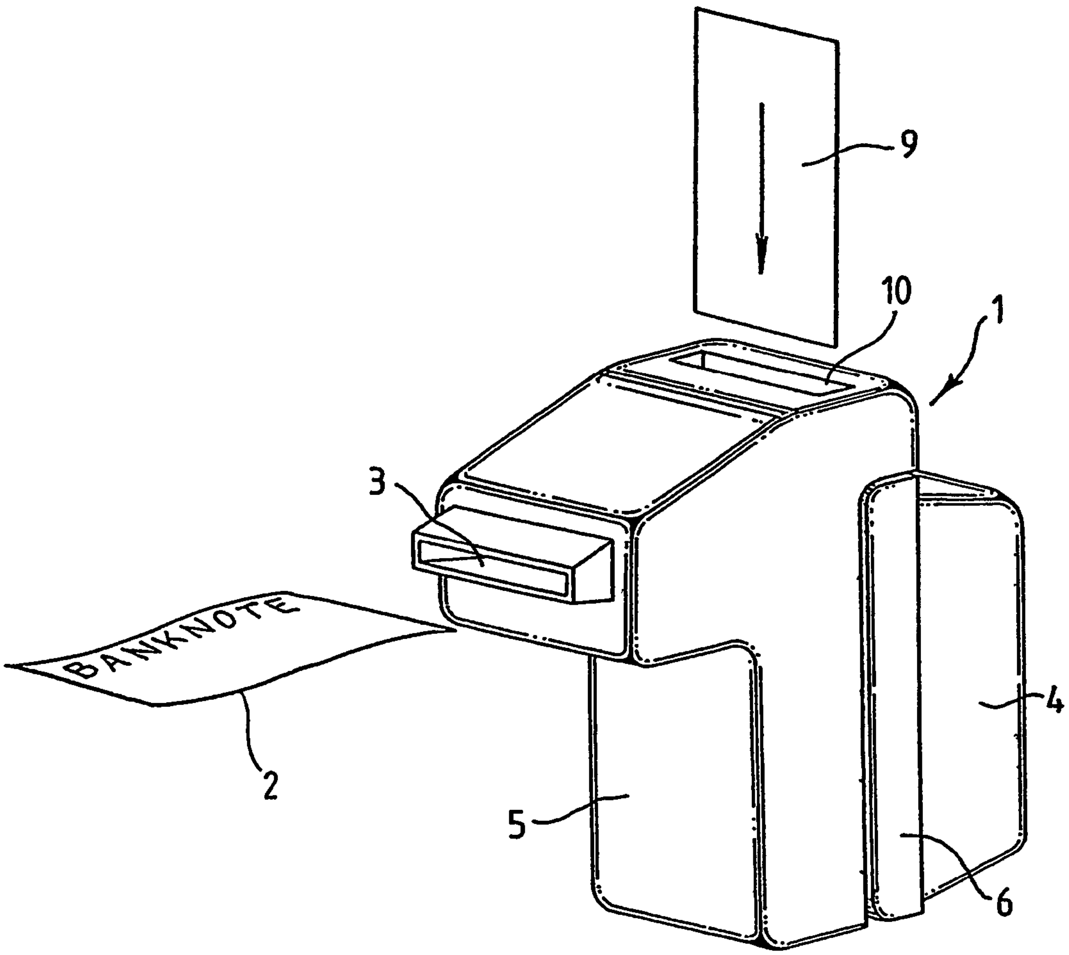
FIG. 3 corresponds to FIG. 1 and shows the insertion of a closure member that is sealed to the container.

Referring to FIG. 3, when the container becomes full of banknotes 2, a closure member in the form of a sealing card 9 is inserted through a second input port 10 in the main body 5, to be heat sealed onto the container 4. Thus, when the frame 6 is opened as shown in FIG. 2, a sealed container is provided containing the banknotes for transport to the cashier's office.

Figure 4:
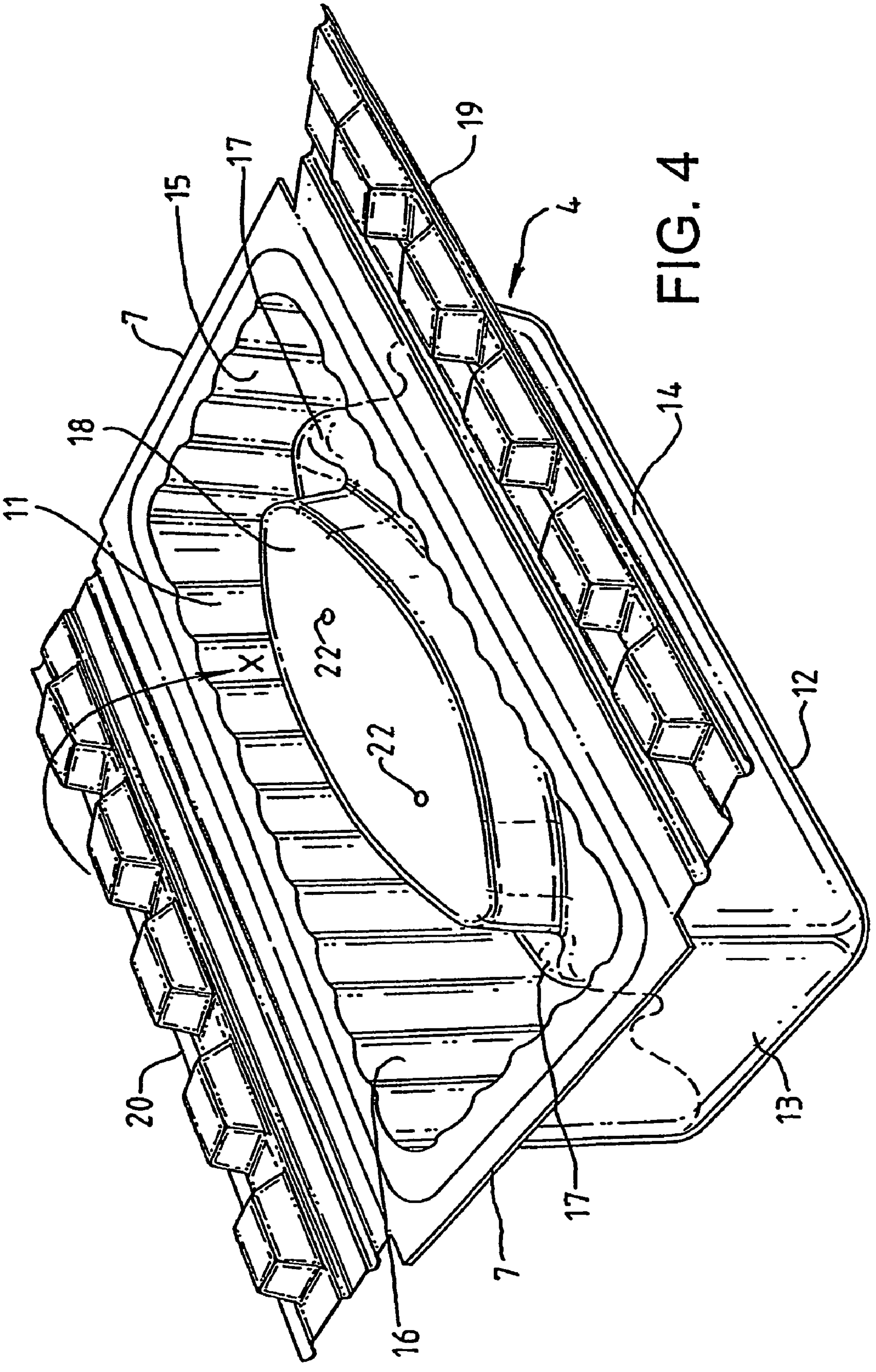
FIG. 4 is a schematic perspective view of first example of a container.

Referring to FIG. 4, the container 4 is manufactured as a one piece moulding of a thermoplastics material and comprises a generally rectangular opening 11 bounded by the lip 7, a base 12, and sidewalls 13, 14, 15, 16 that extend from the base to the opening and the lip 7. The sidewalls 13, 14, 15, 16 are corrugated to provide rigidity.

The dimensions of the opening 11 are chosen to allow the insertion of a particular denomination of banknote, with the sidewalls 14, 16 being longer than sidewalls 13, 15.

The base 12 is moulded to include corrugations 17 that are disposed between a central, base support region 18 and the sidewalls 13, 16. In this example, the base support region 18 is elliptical but as will be evident hereinafter, other shapes can be used. The corrugations 17 act as a compression spring to urge the base support region 18 towards the opening 11 as successive banknotes are inserted into the container 4.

Elongate, castellated wings 19, 20 are hingedly coupled to the lip 7 along the long sides of the container 4. The wings 19, 20 are initially in the configuration shown in FIG. 4 and as a result, a plurality of containers 4 can be stacked one within the other, enabling a supply of containers to be easily delivered and stored adjacent to the packaging device 1 at the point of sale, ready for use.

In order to prepare a container 4 for use in the packaging device 1, a relatively rigid rectangular radio frequency identification (RFID) tag 21 (not shown in FIG. 4 but illustrated in FIG. 8) is placed on the base support region 18. The RFID tag 21 may be in the form of a printed coil or other techniques may be used. More information about RFID tags can be obtained from the RFID Handbook, Klaus Finkenzeller, 1999, John Wiley & Sons. In the present embodiment, the RFID tag 21 is a read/write tag. Typically, such a tag has a read range of about 2 metres and is capable of storing around 2 KB of data.

The RFID tag 21 may comprise a moulded plastics member that couples to the base support region 18 by cooperating pegs and receptacles 22. The RFID tag 21 extends to the sidewalls of the container 4 to support the banknotes. Thereafter, the wings 19, 20 are hinged inwardly from the position shown in FIG. 4, in the direction of arrows X. As explained in more detail hereinafter, the wings 19, 20 when folded inwardly, act as guide rails to allow banknotes to be passed along them for insertion into the container 4 through the opening 11.

Figure 5:
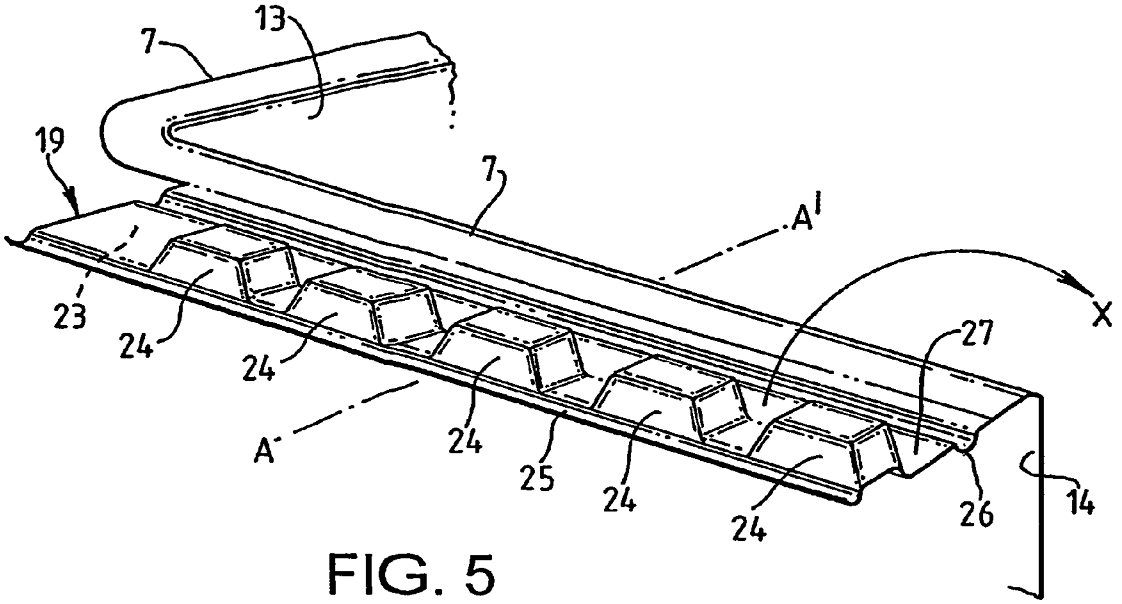
FIG. 5 is partially broken away perspective view of the container with one of its support rails in an open position.
Figure 6:
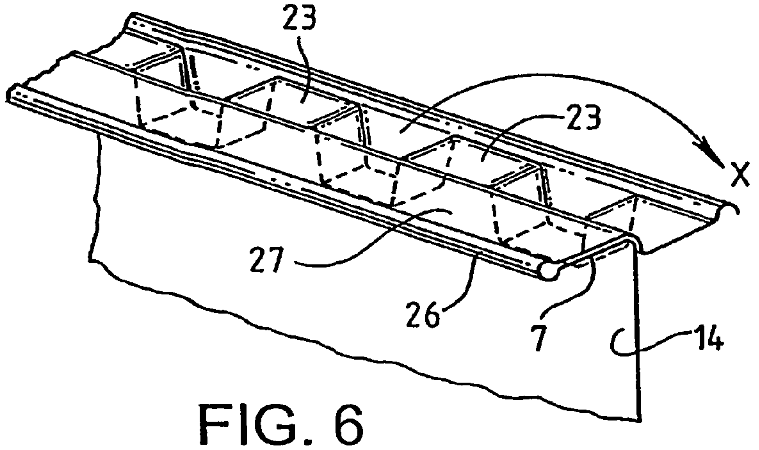
FIG. 6 corresponds to FIG. 5 but with the support rail in a closed position.

The wing 19 is shown in its initial, outwardly extending position in FIG. 5 and its inwardly folded position in FIG. 6. The wing 19 comprises a main guide surface 23 formed with a series of indentations that give rise to castellations 24, an outer lip 25, a hinge line 26 and a coupling surface 27 that connects the main guide surface 23 to the hinge line 26.

Figure 7A:
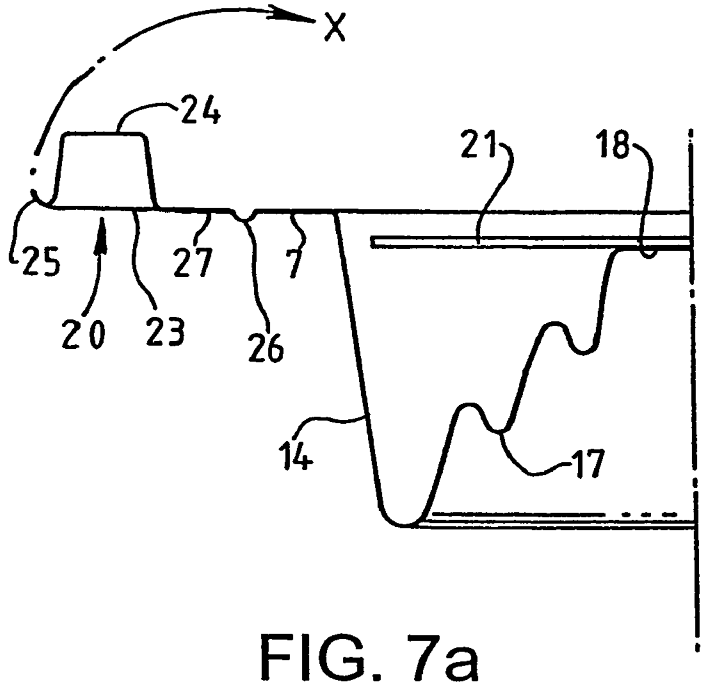
FIG. 7*a* is a partial sectional view of one side of the container when empty taken along the line A-A' of FIG. 5 with the support rail in the open position.
Figure 7B:
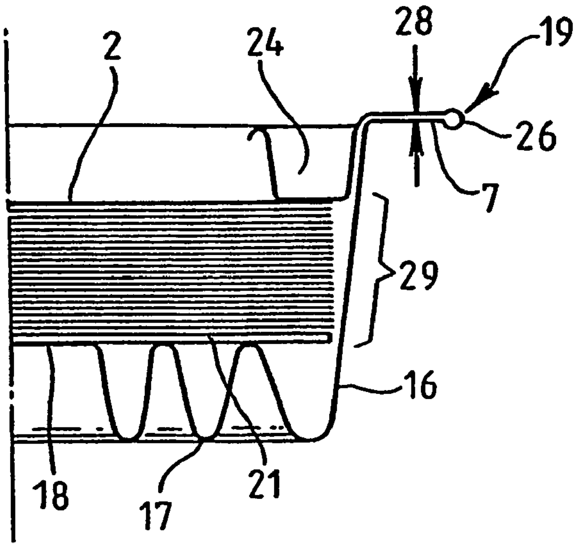
FIG. 7*b* is a partial sectional view of the other side of the container when full of banknotes, taken along the line A-A' of FIG. 5 with the support rail in the open position.

When the wings 19, 20 are folded inwardly in the direction of arrow X, and the container 4 is inserted into the packaging device 1, the coupling surface 27 is welded to the lip 7 by the packaging device 1, in the region 28 shown in FIG. 7*b*. In FIG. 7*a*, the wing 19 is shown in its initial, outwardly extending position, with no banknotes 2 in the container 4 and with the spring corrugations 17 in their initial, uncompressed state. FIG. 7*b* illustrates the configuration when the container 4 has been filled with a stack 29 of banknotes 2. In this situation, the RFID tag 21 has been compressed downwardly to accommodate the stack 29 of banknotes thereby compressing the corrugations 17 in the base of the container 4. The wing 19 has been hinged inwardly in the direction of arrow X and welded in region 28 against lip 7 so that the castellations 24 provide a downwardly depending stop to hold the stack 29 of banknotes within the container 4.

Figure 8:
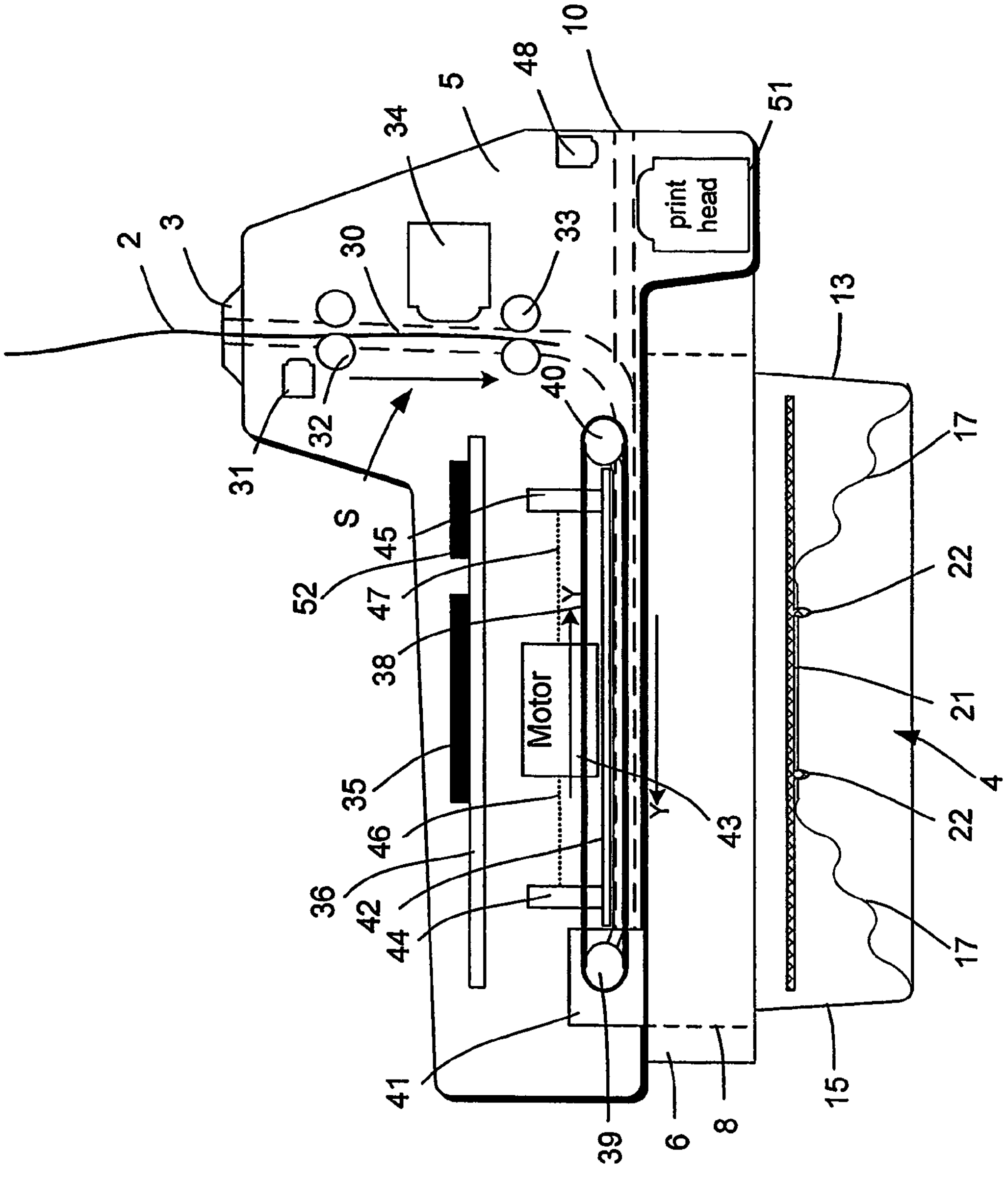
FIG. 8 is a longitudinal, sectional view of the packaging device with the container empty.

The way in which the packaging device 1 fills the container 4 with banknotes 2 will now be described in more detail. Referring to FIG. 8, a cross sectional view of the packaging device 1 is shown, with the container 4 received in frame 6, empty and ready to receive banknotes 2. The main body 5 includes an input path 30 that extends from the first input port 3 through a banknote sensing station S, to the output port 8 in frame 6. When the banknote 2 is inserted into the first input port 3 it is detected by an optical sensor 31 that activates driven roller pairs 32, 33 to drive the banknote 2 past a validation sensor arrangement 34 coupled to validation circuitry 35 mounted on a printed circuit board 36. The validation sensor arrangement 34 and associated circuitry 35 may correspond to our Ardac technology described in U.S. Pat. No. 4,348,656. In the event that the banknote 2 is determined to be a true banknote as opposed to a fraud by the sensor arrangement 34 and associated circuitry 35, the drive roller pairs 32, 33 transport the banknote 2 towards the output port 8. Otherwise, the roller pairs 32, 33 are driven in reverse so that the banknote 2 is ejected from the input port 3.

Figure 9A:
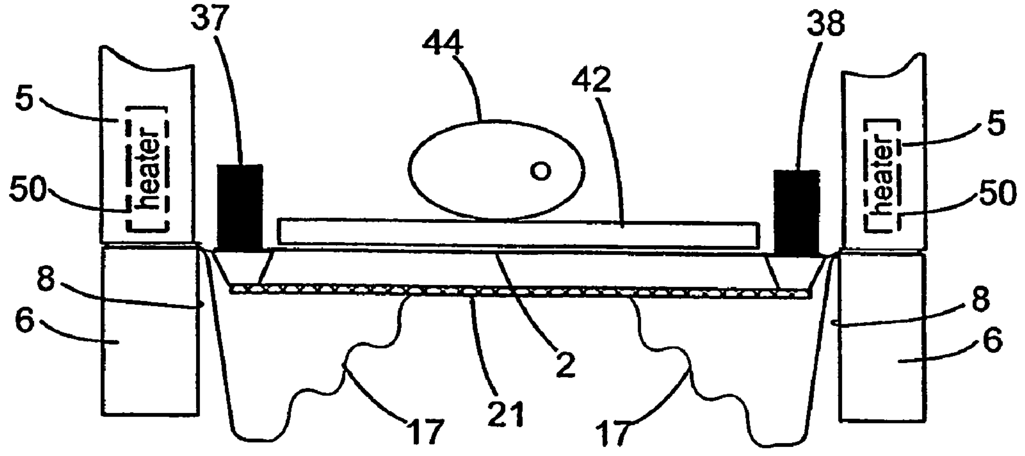
FIG. 9*a*-9*d* are views of the packaging device in transverse section illustrating operation of the drive mechanism to fill the container.

Assuming that the banknote 2 is acceptable, it is passed by the rollers 32, 33 towards a banknote drive mechanism, which in this example includes a pair of drive belts 37, 38 shown more clearly in FIG. 9*a*, which engage longitudinal side edges of the banknote 2 and move it into alignment with the output port 8. Considering the belt 38 in more detail, it extends between pulleys 39, 40 which are driven by a motor 41 in the direction of arrows Y such that the banknote 2 is drawn by the belts 37, 38 in a direction transverse to its major face along the input path 30 until it becomes aligned with the output port 8.

The banknote drive mechanism also includes a plunger 42 in the form of a rigid plate that is mounted for movement downwardly between the belts 37, 38 so as to drive the banknote 2 into the container 4. To this end, a motor 43 drives two pairs of elliptical cams 44, 45 through a drive train 46, 47 illustrated schematically in dotted outline. In use, the cams 44, 45 rotate in the direction of arrows Z (shown in FIG. 9*b*) to drive the plunger 42 together with the banknote 2, into the container 4 through the opening 11, in a direction perpendicular to the plane of the banknote when it arrives at the opening 11 along the input path 30.

Figure 9B:
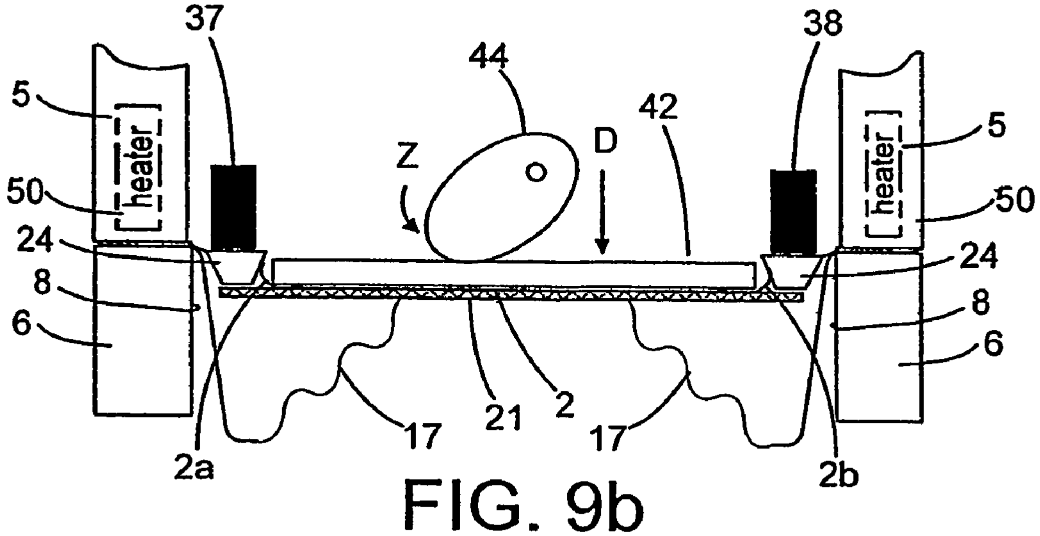

This process is shown in more detail in FIGS. 9*a*-9*d*. Referring to FIG. 9*a*, the banknote 2 is driven by belts 37, 38 along the main guide surfaces 23 of the inwardly folded wings 19, 20. The main guide surfaces 23 act as rails to support the longitudinal side edges of the banknote 2. When the banknote 2 becomes aligned with the output port 8 in the frame 6, the motor 43 is operated to rotate the cams 44, 45 downwardly as shown in FIG. 9*b*. As a result, the plunger 42 is moved downwardly in the direction of arrow D so that the banknote 2 is moved downwardly into the container past the wings 19, 20 thereof. Side edges 2*a*, 2*b* of the banknote deform so that they withdraw from the main guide surfaces 23 as the plunger 42 moves downwardly past the castellations 24, so that the entire banknote 2 is moved into the container 4. As the cams 44, 45 continue to rotate, the plunger 42 and the banknote 2 are driven downwardly against the RFID tag 21, such as to compress the corrugations 17, thereby allowing the side edges 2*a*, 2*b* of the banknote 2 to lie flat and become disposed underneath the castellations 24.

Figure 9C:
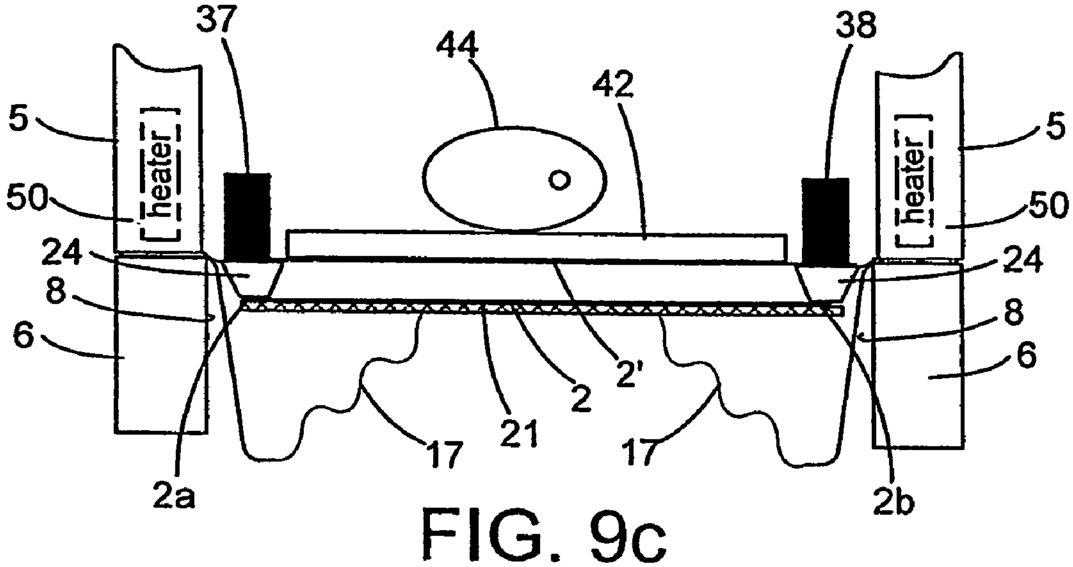

The cams 44, 45 are then rotated to their initial position ready to engage the next banknote 2' shown in FIG. 9*c*. Thus, the banknote 2 is inserted into the container 4 and is held therein by the compressive force of the spring corrugations 17, against the castellations 24, which act as a stop to hold the banknote 2 in the container 4.

Figure 9D:
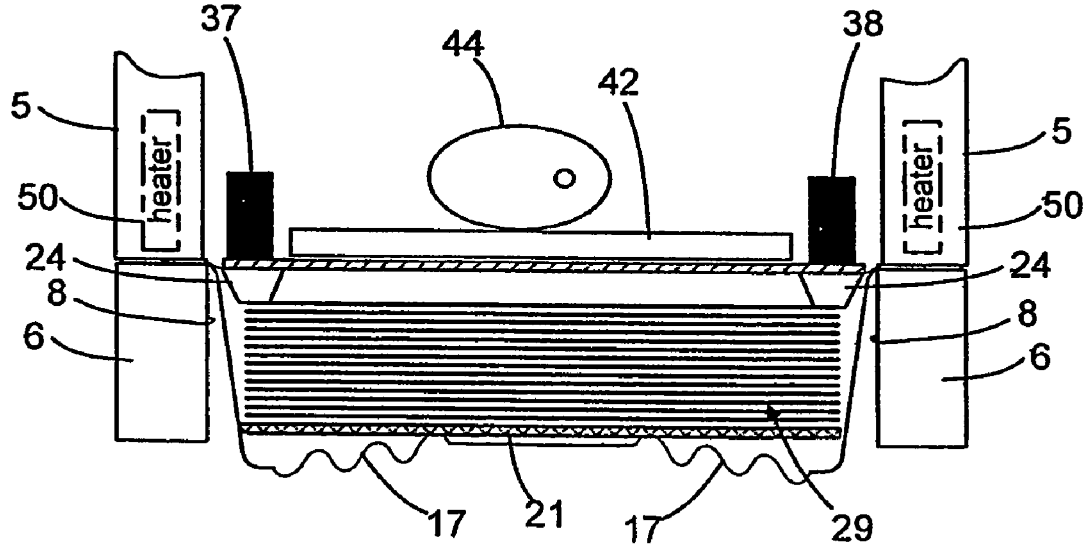

Successive banknotes are inserted into the container 4 to form the banknote stack 29 as shown in FIG. 9*d*, with the uppermost banknote being held under the castellations 24.

Figure 10:
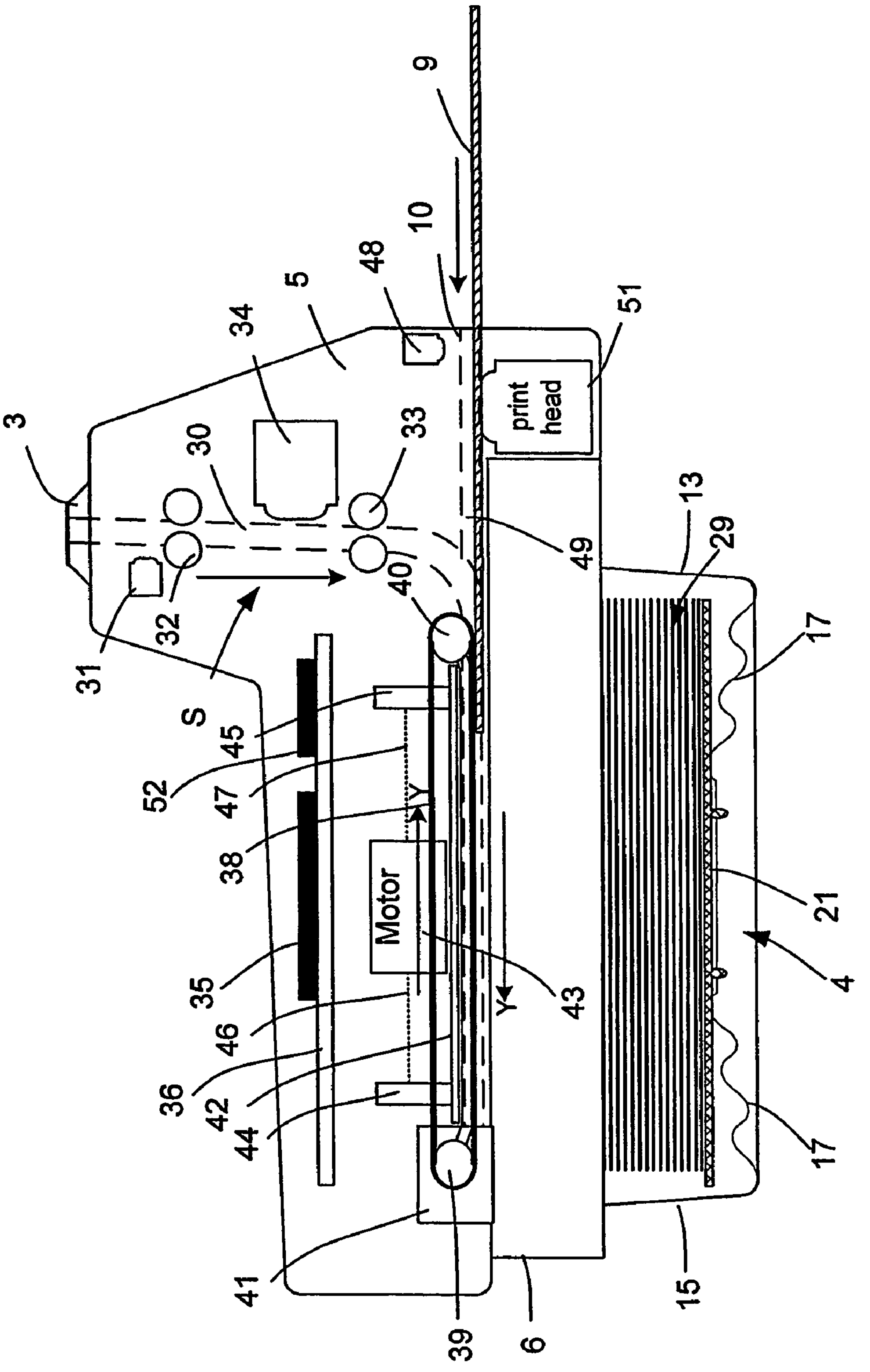
FIG. 10 corresponds to FIG. 8 but with the container full.

FIG. 10 shows the stack 29 in the container 4, with the RFID tag 21 having been moved downwardly. The compressive force of the spring corrugations 17 urges the stack 29 upwardly against the castellations 24 to hold the banknotes securely within the container 4.

When the container 4 is full, an operator inserts the closure member 9 through the second input port 10. The closure member 9 comprises an optically transparent or translucent sheet of plastics material. The closure member 9 is detected by an optical sensor 48 and moves along a closure member inlet path 49 that extends into the input path 30 for banknotes, so as to become engaged with and driven by the drive belts 37, 38 until it becomes aligned with the output port 8, in a similar manner to the stacking of the banknotes. The closure member 9 thus becomes positioned over the inlet 11 of the container 4 with the side edges of the member 9 extending over the main guide surfaces 23 of the wings 19, 20 on the longer sides of the container 4, and also over the lip 7 on the shorter sides of the container 4. As shown in FIG. 9*d*, the main body 6 of the packaging device includes electrical heaters 50. In use, when the closure member 9 becomes aligned with the opening 11 of the container 4, the heaters 50 are switched on so as to heat seal the closure member 9 onto the wings 19, 20 and also to weld the wings themselves onto the lip 7 of the container 4, i.e. to produce the weld 28 shown in FIG. 7.

As shown in FIG. 10, the main body 5 includes an RFID reader/writer 52 operable to read data from or write data to the RFID tag 21. The validation sensor arrangement 34 and associated circuitry 35 are operable to determine the monetary value attributed to each banknote packaged in the container 4. Thus, value data comprising information such as the monetary value attributed to each banknote packaged in the container 4, the total number of banknotes packaged and the number of banknotes of different denominations packaged, in addition to other information, can be written on the RFID tag 21 using the RFID reader/writer 52. The value data may, therefore, comprise a record of the order in which banknotes of different denominations are stacked in the container, which can be used to determine whether the contents of the container 4 have been pilfered after it has been sealed. Alternatively, the denominations of the banknotes on the top and bottom of the stack 29 may be stored so that an indication that pilfering has taken place may be obtained from a visual inspection of the top and bottom notes of the stack 29 when viewed through the transparent walls of a sealed container 4. Alternatively, the denomination of the last banknote to be packaged in the container may be recorded for the purpose of resolving a dispute in the event that a customer questions the denomination of a banknote they use to carry out a transaction at the POS.

After sealing of the closure member 9 on the container 4, the frame 6 can be opened as shown in FIG. 2 and the sealed container can be transported to another location, for example to the cashiers office. The resulting packaged banknotes cannot readily be tampered with during transport because the closure member 9 is heat sealed to the container 4 protecting its contents. If the sealed container 4 is opened, this is readily apparent and the container 4 cannot be subsequently reused in the packaging device 1. Thus, the risk of fraud is materially reduced.

Figure 11:
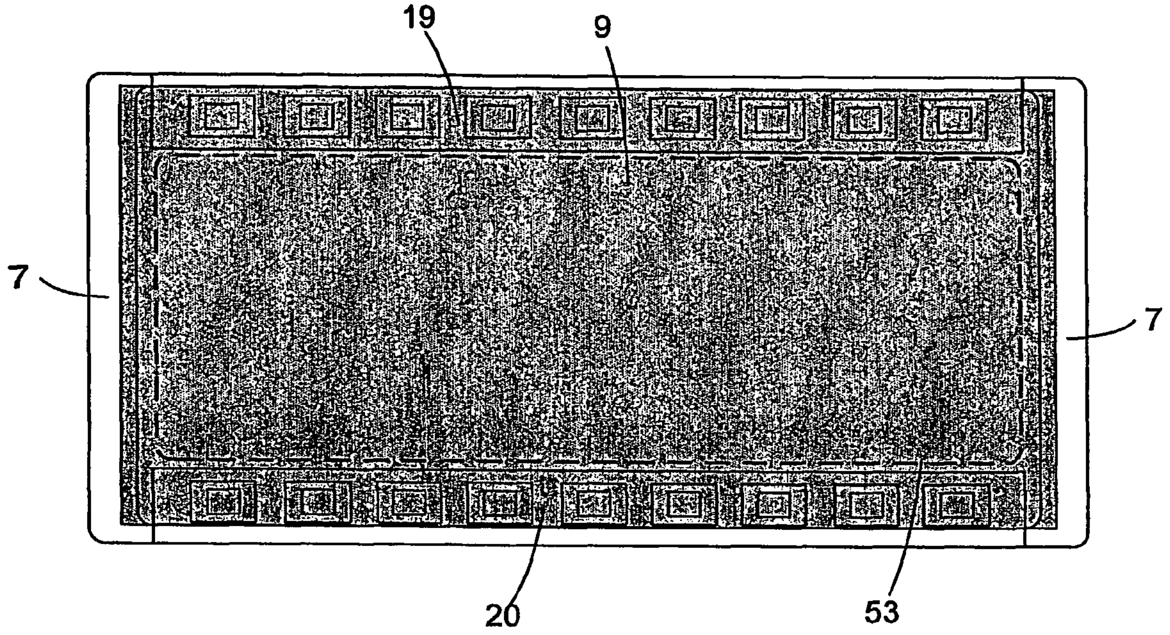
FIG. 11 is a top plan view of the container shown in FIG. 10 when it has been removed from the packaging device.

FIG. 11 illustrates the container 4 in plan view with the closure member 9 heat sealed onto the wings 19, 20 and the lip 7. Printed data, such as the number of notes in the container, their denomination and the time and place where they were packaged (not shown) may be printed on the underside of the closure member 9 by means of the print head 51 shown in FIG. 8.

The closure member 9 includes a line of weakness 53 to facilitate opening the container 4 when filled with banknotes. The closure member 9 can be manually depressed downwardly in the centre thereof so as to cause the closure member 9 to tear along the line of weakness 53. The contents can then be removed.

It will be understood that the container 4 cannot be reused for packaging banknotes in the packaging device 1 once the container 4 has been opened, providing a clear visual indication of whether the container 4 has been tampered with after closure. Moreover, when opened, data printed on the closure member 9 can be used to verify the contents of the container 4.

Figure 12:
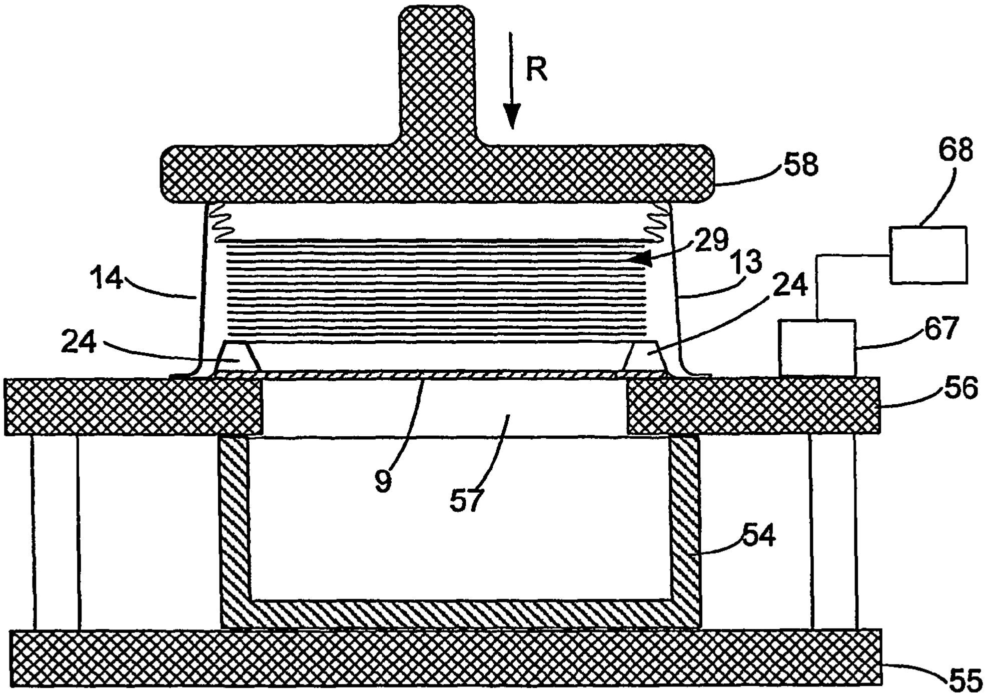
FIG. 12 is a sectional view of a container emptying device for emptying the contents of the container, ready for use.
Figure 13:
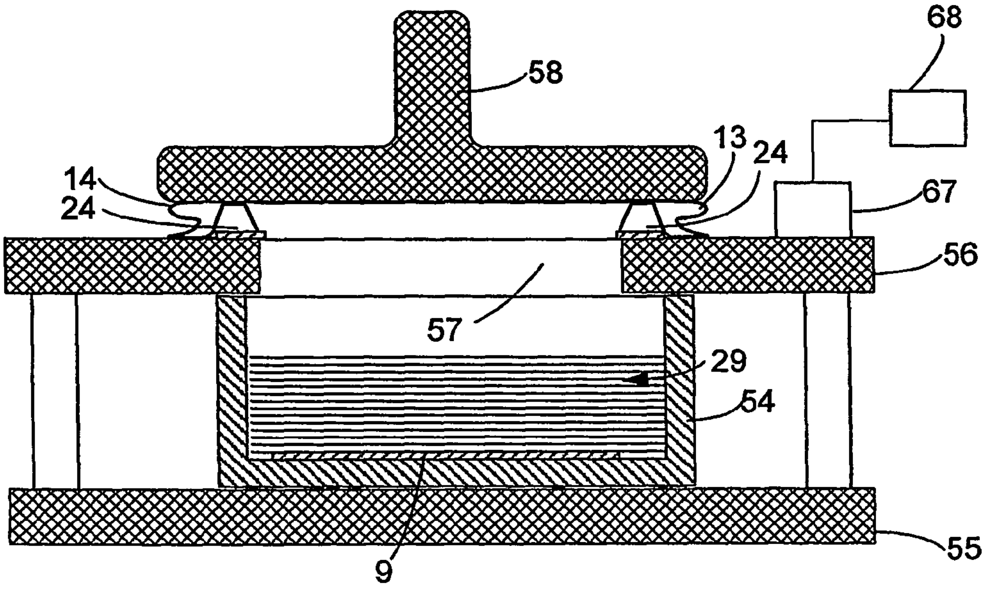
FIG. 13 is a sectional view of the emptying device after use.

The process of opening the container can be automated by means of a device illustrated in FIGS. 12 and 13. The device empties the contents of the container 4 into a tray 54 received on a support 55 beneath a platform 56 that includes a release aperture 57 with dimensions corresponding to the opening 11 of the container 4. In use, the container 4 is placed upside down with opening 11 coextensive with the release aperture 57. A ram 58 is operated downwardly in the direction of arrow R with sufficient force to collapse the sidewalls 13, 14, 15, 16 of the container 4 and press the stack 29 of banknotes against the closure member 9, causing it to burst along the line of weakness 53. Continued movement of the ram 58 in the direction of arrow R causes the banknotes to deform past the castellations 24 and drop into the tray 54 as shown in FIG. 13. The tray 54 can then be removed from the device. The ram 58 is released and the remains of the container 4 are discarded.

The device for automatically unpacking the container 4 may further be provided with an RF reader/writer 67, a processor 68 and a counter (not shown) for automatically counting the contents of the container 4. The counter may comprise any suitable note counter, which are well known in the art. The contents of the container 4 can, therefore be reconciled with the information stored on the RFID tag 21 using the RF reader/writer 67, the processor 68 and the counter, to be described in more detail below.

Figure 14:
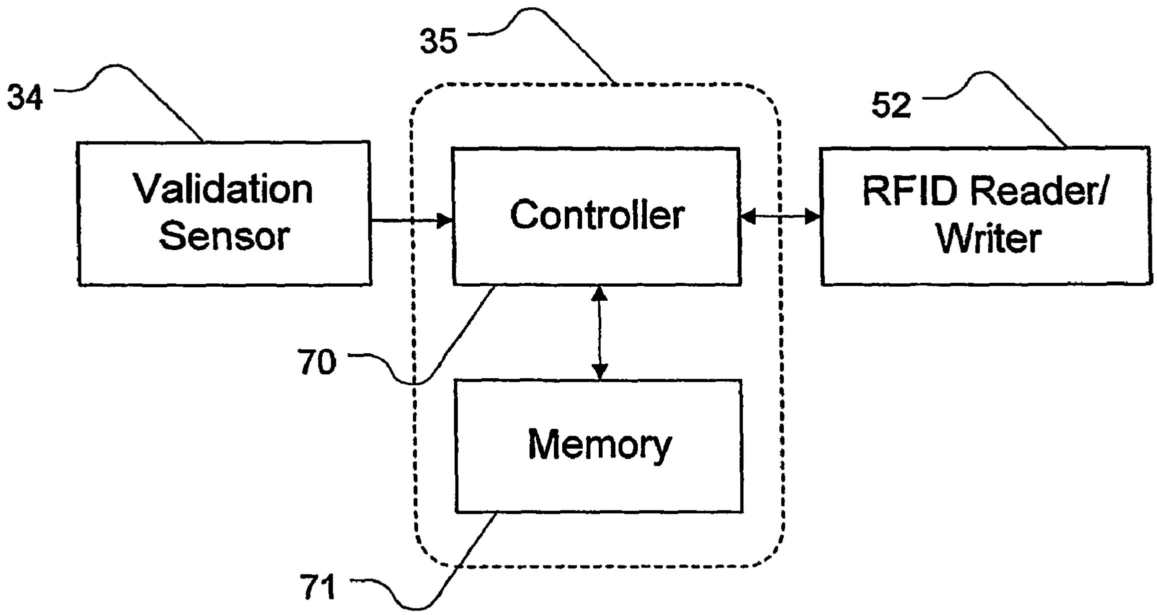
FIG. 14 shows an example of the validation circuitry of the packaging device of FIG. 8.
Figure 15:
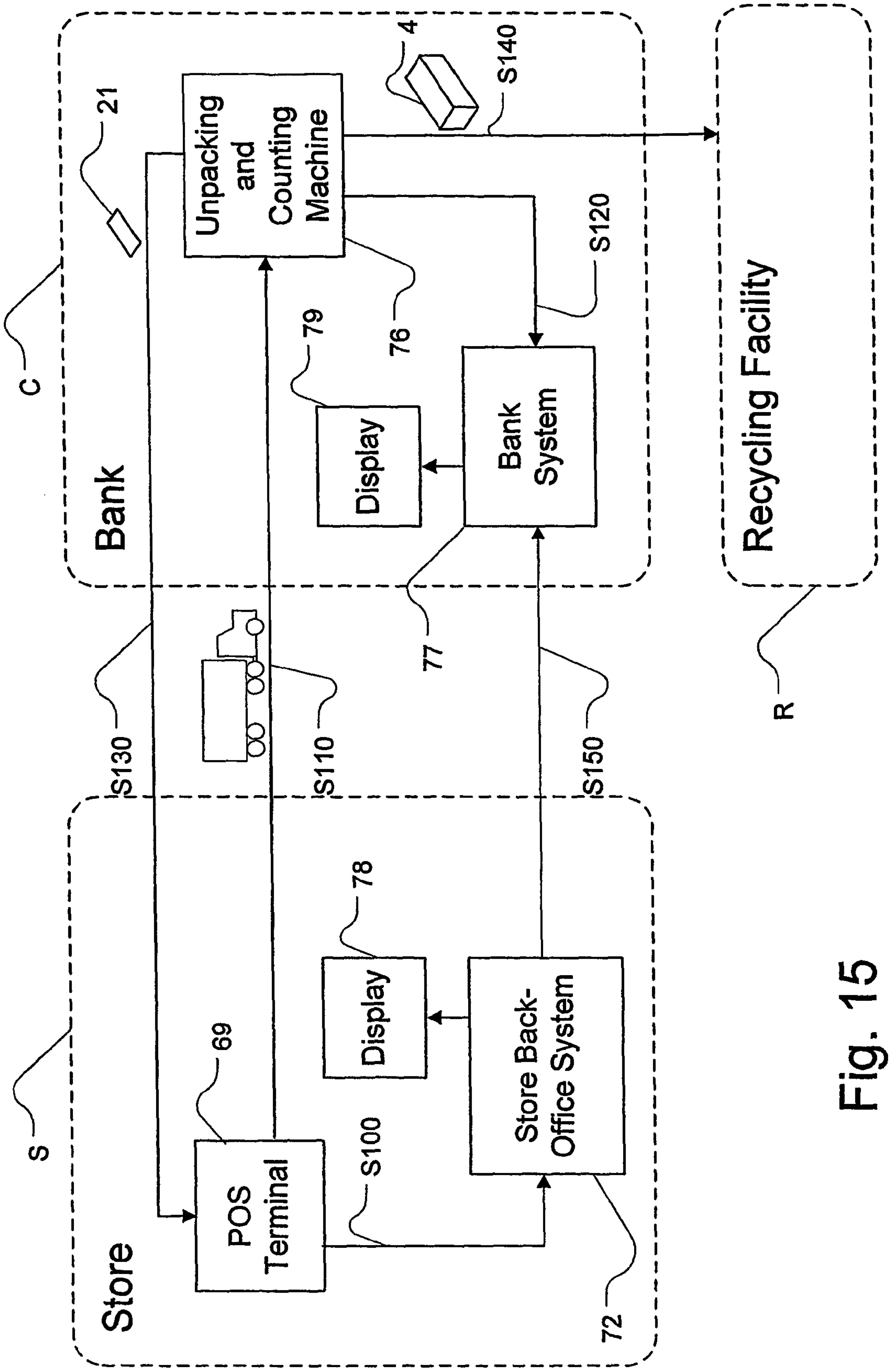
FIG. 15 is a diagram illustrating an example of a process of transporting a full container from a POS terminal to a bank according to the present invention.

The process of transferring banknotes from a POS terminal 69 in a store S to a bank or counting centre C will now be described with reference to FIGS. 14 and 15.

Firstly, an RFID tag 21 is placed in the bottom of an empty container 4. The container 4 is then loaded into the packaging device 1 by an operator at a POS terminal 69. When a customer transaction is completed, the operator may insert a banknote 2, or the like, through the input port 3 of the packaging device 1. Banknotes inserted through the input port 3 are stored in the container 4 according to the method described above.

As successive banknotes are inserted through the input port 3, the denomination of each banknote is determined by the validation sensor 34 and the validation circuitry 34. Referring to FIG. 14, the validation circuitry 35 may comprise a controller 70 and a memory 71. In this case, the controller 70 is operable to receive a signal from the validation sensor 34, determine the denomination of the banknote 2 and control the RF reader/writer 52 to write value data to the RFID tag 21 in the container 4, comprising the denomination of the banknote 2, in addition to the time and date at which the banknote 2 was inserted and the name of the operator who inserted it. Alternatively, in response to a control signal from the controller 70, this information may be stored in the memory 71 together with corresponding information for other banknotes packaged in the container 4. The information stored in the memory 71 may subsequently be transferred to the RFID tag 21 in the container 4 by means of the RF reader/writer 52, in response to a control signal from the controller 70.

When the container 4 is full or there are no further transactions to be carried out, the container 4 is sealed using a closure member 9 according to the above described method. At this time, the information stored on the RFID tag 21 of the sealed container 4 may be downloaded to a back office system 72 (S100). The back office system 72 may be provided with display means 78 for viewing the information stored on the RFID tag 21. A hard copy of the contents of the sealed container 4 may also be printed at the POS terminal 69.

Figure 16A:
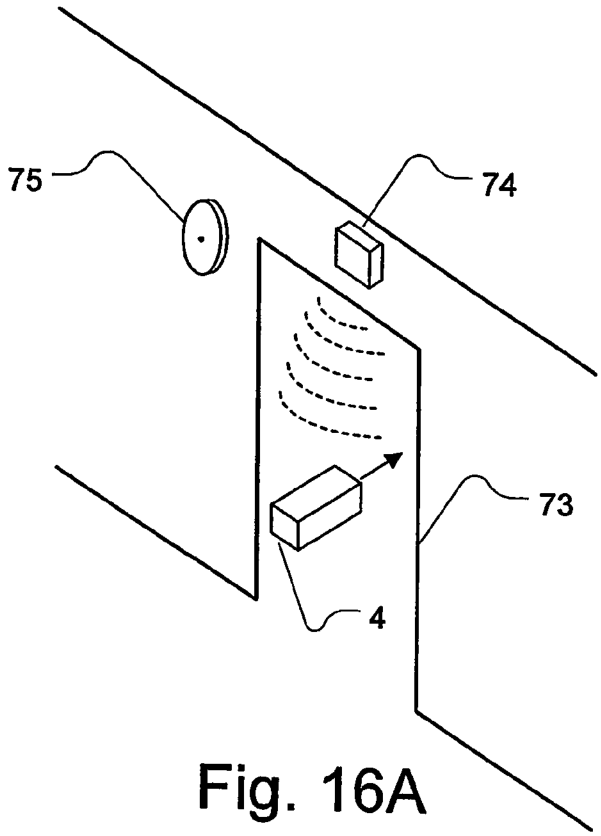
FIGS. 16*a* and 16*b* illustrate the use of additional RF devices to track the container through the doorway of a store or bank in the process of FIG. 15.
Figure 16B:
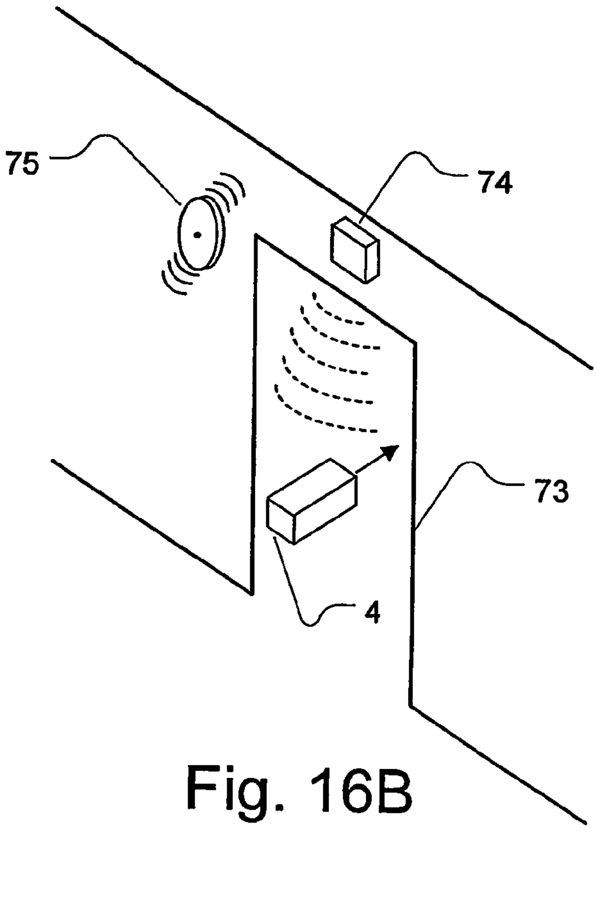

Additional RF reader/writers may be employed to track the progress of the sealed container 4 from the POS terminal 69 to a bank or counting centre C. Referring to FIGS. 16*a,* the doorway 73 to the store S in which the POS terminal 69 is located may be provided with an RF reader/writer 74 for detecting the RFID tag 21 in the container 4, when the container 4 passes through it. At this time the RF reader/writer 74 may write tracking information, such as the time/date/place at which the RFID tag 21 was detected, to the RFID tag 21 in the container 4. This tracking information may also be transmitted to the store back office system 72, so as to enable a user to monitor the progress of the container 4 on its journey to the bank using the display means 78. Alternatively, referring to FIG. 16*b,* the RF reader/writer 74 may be configured to set off an alarm 75 when the passage of the container 4 through the doorway 73 is detected. RF reader/writers for writing tracking information to the RFID tag 21 may also be installed in a vehicle used for transporting the container 4 and at the entrances to the bank or counting centre C.

When the container 4 arrives at the bank or counting centre C, the container 4 is automatically unpacked according to the method described with reference to FIGS. 12 and 13 and the contents of the container 4 are counted using an automatic unpacking and counting device 76 (S110). At this time the counter of the automatic unpacking and counting device 76 generates value data which may be reconciled with the POS value data stored on the RFID tag 21, so as to determine that the contents of the container 4 have not been tampered with.

The RF reader/writer 67 on the automatic unpacking and counting device 76 can be used to read the information stored on the RFID tag 21 under the control of the processor 68. The POS value data read from the RFID tag 21 may then be compared with the bank value data generated using the counter on the automatic unpacking and counting device 76. Should the bank value data differ from the POS value data read from the RFID tag 21, or should the time taken to transport the container 4 from the POS terminal 69 to the bank exceed a predetermined limit, then an alarm may be triggered.

When the bank value data is determined to reconciled with the POS value data read from the RFID tag 21, then the reconciled value data may be stored in a database on a bank system 77 for auditing/credit control purposes (S120). The bank system 77 may be provided with display means 79 for viewing the information read from the RFID tag 21 and the contents of the container 4 as determined by the unpacking/ counting device 76. The RFID tag 21 may then be erased, using the RF reader/writer 67 on the unpacking/counting device 76 in response to a command signal from the processor 68, or otherwise, and removed from the container 4 so that it may be reused (S130).

The contents of the container 4 may also be reconciled with one or more of information printed on the closure member 9 and a hard copy of the contents of the container 4 printed at the POS terminal 69. The empty container 4 and the closure member 9 may then be sent to a recycling facility R to be recycled (S140).

In another embodiment of the present invention, the contents of the container may be tracked using a plurality of networked systems, comprising the store back-office system 72 and the bank back-office system 77. In this example, the RFID tags used for tracking the containers are read-only RFID tags, each of which has identification information, such as a unique serial number, stored thereon. Since read-only RFID tags are used, the RF reader/writer 52 described in the previous embodiment may be replaced with an RF reader in the present embodiment.

The process of transferring banknotes from a POS terminal 69 in a store S to a bank or counting centre C in this second embodiment will now be described with reference to FIGS. 14 and 15.

Firstly, an operator logs on to the store's system 72 at a POS terminal 69. Next, a read-only RFID tag is placed in the bottom of an empty container 4. The container 4 is then loaded into the packaging device 1 by the operator. The RF reader in the packaging device 1 reads the identification information stored on the RFID tag in the container 4. The identification information is then stored in a database on the store's back office system 72.

When a customer transaction is completed, the operator may insert a banknote 2, or the like, through the input port 3 of the packaging device 1. Banknotes inserted through the input port 3 are stored in the container 4 according to the method described above. As successive banknotes are inserted through the input port 3 the denomination of each banknote is determined by the validation sensor arrangement 34 and the validation circuitry 35. Referring to FIG. 14, the validation circuitry 35 may comprise a controller 70 and a memory 71. In response to a control signal from the controller 70, POS value data, comprising the denomination of the banknote packaged in the container 4, in addition to the time at which it was packaged and the operator who packaged it, may be stored on the store's back office system 72 in a database record associated with the identification information on the RFID tag in the container 4 (S100).

Alternatively, the information may be stored in the memory 71 in response to a control signal from the controller 70. Thereafter, when the operator's shift finishes, or when the container 4 is full, the container 4 may be sealed using a closure member 9 according to the method described above. At this time, the information stored in the memory 71 may be transferred to the database on the store's back office system 72 under the control of the controller 70. The store's back office system 72 may be provided with display means 78 for viewing the information stored in the database.

Once sealed, the container 4 may be removed from the packaging device 1 and transported to a bank or counting centre C (S110). Additional RF readers may be employed to track the progress of the container 4 from the POS terminal 69 to the bank or counting centre C. Referring to FIG. 16*a*, the doorway 73 to the store S in which the POS terminal 69 is located may be provided with an RF reader 74 for detecting the RFID tag in the container 4, when the container 4 passes through it. The RF reader 74 may read the identification information on the RFID tag and update the corresponding database record on the store's back office system 72 with tracking information, such as the time/date at which the container 4 passed through the doorway 73. Alternatively, referring to FIG. 16*b*, when the RF reader 74 on the doorway 73 detects the RFID tag in the container 4, an alarm 75 may be triggered.

The entrances to the bank or counting centre C may similarly be provided with RF readers for reading the identification information on the RFID tag in the container 4 and updating a database on a bank system 77 with the identification information of the RFID tag and the tracking information, such as the time/date at which the container 4 enters the bank.

Once inside the bank C the container 4 can be automatically unpacked according to the method described with reference to FIGS. 12 and 13 and the contents can be counted using an automatic unpacking and counting device 76 (S110). At this time, the counter of the automatic unpacking and counting device 76 generates bank value data which may be reconciled with the POS value data, in order to determine that the contents of the container 4 have not been tampered with. The automatic unpacking/counting device 76 may comprise an RF reader 67, for reading the identification information on the RFID tag in the container 4, and a processor 68 for controlling the transmission of the identification information and the bank value data generated by the counter to the bank system 77. The identification information and the bank value data are then stored in a database on the bank system 77 (S120). The bank system 77 may be provided with display means 79 for viewing the information stored in the bank database.

In response to receiving the identification information and the bank value data from the automatic unpacking and counting device 76, the bank system 77 may send a request signal to the store system 72, across the internet or via another known network connection, requesting POS value data associated with the identification information read from the RFID tag.

In response to the request signal, the store back-office system 72 may transmit the POS value data to the bank system 77, over the internet or otherwise, which can be stored in the bank database in association with the identification information read from the RFID tag under the control of the bank system 77 (S150). The bank system may then compare the bank value data to the POS value data. In the case that the bank value data, as determined by the automatic counting device 76, differs from the POS value data, an alarm may be triggered. Alternatively, in the case that the bank value data is reconciled with the POS value data, then the reconciled value data on the bank's database may be used for auditing/credit control purposes.

Thereafter, the RFID tag can be removed from the empty container 4, and the database records relating to the identification information on the RFID tag may be deleted so that the tag can be reused (S130). The empty container 4 can be sent to a recycling facility R to be recycled (S140).

Figure 17:
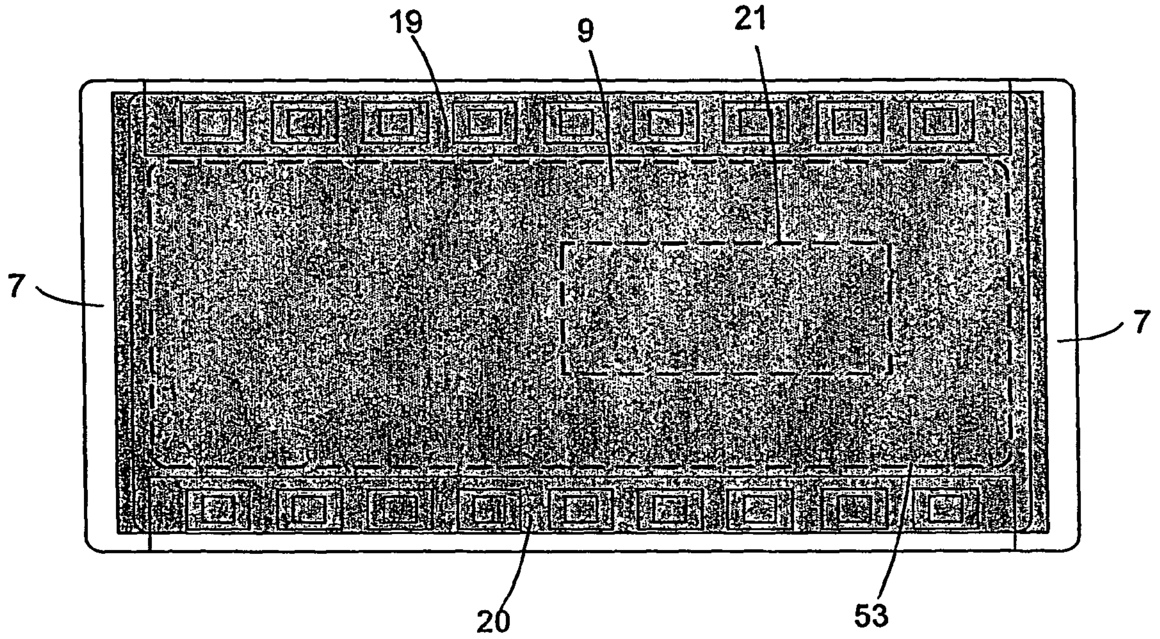
FIG. 17 is a top plan view of a container in which the RFID tag is attached to the underside of a closure member.

Referring to FIG. 17, in a variant of the above-described examples of the present invention, the RFID tag may be releasably attached to the underside of the closure member 9, such that when the closure member 9 is welded to the container 4, the RFID tag is sealed inside the container 4. In this case, a separate rectangular platen, made from a sheet of plastics material or cardboard, may be placed on the base 18 of the container 4 to perform the function of keeping the banknotes 2 flat as they are packaged. When the container 4 is emptied, the RFID tag may be peeled off the closure member 9 and reused prior to the container 4 being recycled. In the case that the RFID tag is a read/write RFID tag and is disposed on the closure member 9, it is preferable that the information relating to the contents of the container 4 is only written on the RFID tag when the container 4 is sealed. Furthermore, when the RFID tag is a read-only RFID tag and is disposed on the closure member 9, it is preferable that the serial number of the RFID tag is only read and the contents of the container 4 stored on the store's back-office system when the container is sealed.

Figure 18:
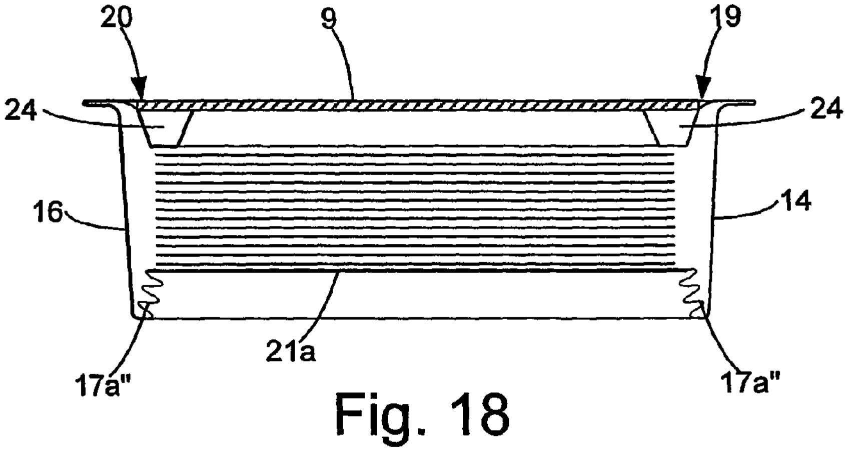
FIG. 18 is a transverse section of another embodiment of the container.
Figure 19:
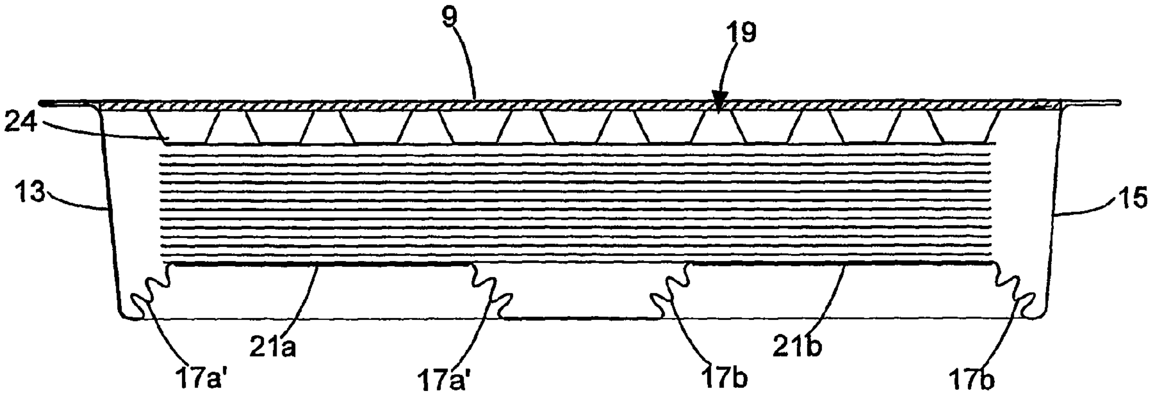
FIG. 19 is a longitudinal section of the container shown in FIG. 18.
Figure 20:
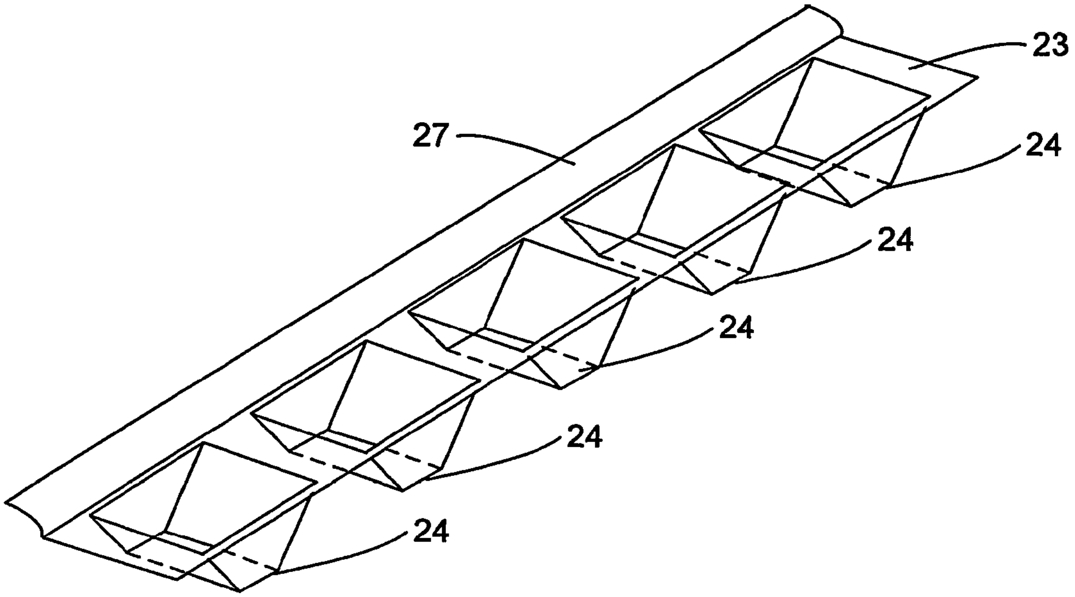
FIG. 20 is a perspective view of a support rail of the container of FIGS. 18 and 19.

FIGS. 18 to 20 illustrate a modified version of the container 4, which obviates the requirement for a separate platen member. In the container of FIG. 4, the RFID tag 21 acts as a platen to provide a rigid support for the relatively flexible banknotes as they become stacked in the container 4 so that side edges of the banknotes can be reliably abutted against the undersides of the castellations 24. Without a relatively rigid platen, the relatively flexible banknotes may tend to curve around the base support region 18 and the corrugations 17 in a domed configuration such that the banknotes are not reliably held on the undersides of the castellations 24. In the container shown in FIGS. 18 to 20, a platen is formed integrally in two parts 21*a*, 21*b* with the base of the container 4. As shown in FIG. 18, the platen 21*a* extends substantially the entire width of the container 4 so that the stack 29 of banknotes within the container is supported across the entire width of the banknotes by the relatively rigid platen 21*a*. The corrugated regions 17*a* around the platen 21*a* give rise to an integral compression spring with the main compressive force being given by regions 17*a*' shown in FIG. 19 with the longitudinal portions 17*a*" providing less of a spring effect. It will be understood that the platen region 21*b* is configured in a similar manner with surrounding integral springs 17*b*. In the case that the container has an integrally formed platen 21*a*, 21*b*, it is preferable that the RFID tag is releasably attached to the underside of the closure member 9 as described above.

Figure 21:
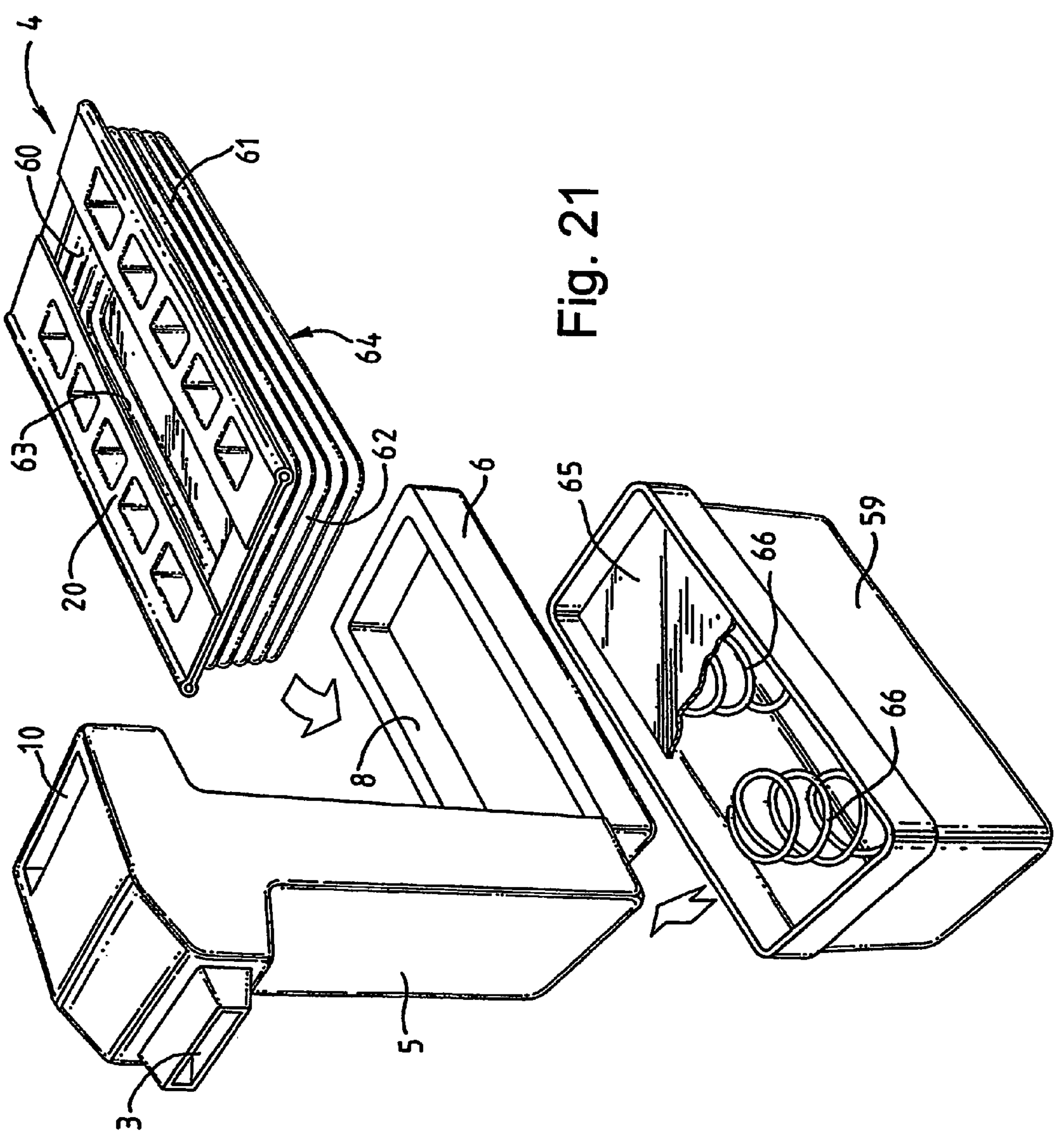
FIG. 21 is a schematic perspective view of another embodiment of the invention in which the container does not have an integral spring.

Another embodiment of the invention is shown in FIG. 21, which is generally similar to the example shown in FIGS. 1 to 3, with the modification that the container 4 does not contain an integrally moulded spring in its base and instead the spring function is performed by an external loading box 59 which fits onto the underside of the frame 6.

The container 4 is integrally moulded in a plastics material and has a generally rectangular lip 7 and wings 19, 20 that function as previously described, with concertina side walls 60, 61, 62, 63 that extend to a planar base 64. The container 4 is placed in the packaging device as previously described, within the frame 6, and the loading box 59 is fitted to its underside. The concertina side walls 60-63 do not exhibit any significant spring function on the notes stacked in the container 4. Instead, the loading box 59 contains a platen 65 which is urged by compression springs 66 against the base 64 of the container 4 whilst the banknotes are being stacked therein by the packaging device 1. A closure member 9 is then inserted through inlet 10 and heat sealed onto the container 4 as previously described. The sealed container is then removed from the frame 6 and the loading box 59 for transport to a remote location where it is opened under secure conditions and then disposed of, having performed its useful function and no longer being capable of receiving a stack of banknotes from the packaging device 1. In the embodiment described with reference to FIG. 21, it is preferably the RFID tag is releasably attached to the underside of the closure member 9 as described above.

In a further embodiment of the present invention, an RFID tag may be included on or in a cassette such as the WACS 5 (World Acceptor Cassette System) described above. Thus, it is possible to easily maintain a record of the contents of an individual cassette and to track the progress of the cassette from a POS to a counting centre or bank.

Many modifications and variations of the described embodiments fall within the scope of the invention. For example, whilst the packaging of banknotes has been described, other sheet objects with an attributable monetary value can be packaged in accordance with the invention, such as tokens or coupons, which may be bar-coded, and vouchers providing a discount or other promotional scheme.

The invention claimed is:

1. A packaging system for packaging a stack of sheet objects that have an attributable monetary value in a container, comprising:

(i) a packaging device, comprising:

means for determining first value data relating to a sheet object to be stacked in the container and an RF reader/writer for writing said first value data to an RFID device;

(ii) at least one container configured to be filled with a stack of sheet objects by the packaging device;

(iii) a reusable RFID device disposable within the container;

(iv) a non-reusable closure member for providing a one-time seal for the container to confine the stack of sheet objects and the RFID device; and (v) an unpacking device for removing sheet objects from the container and determining second value data relating to sheet objects removed from the container.

2. A system according to claim 1, wherein the unpacking device comprises RF means for reading the first value data stored on the RFID device.

3. A system according to claim 2, comprising a first processing means having a first database for storing said first data value therein and a second processing means having a second database for storing the first value data read from the RFID device and the second value data determined by the unpacking device.

4. A system according to claim 3, comprising an alarm, wherein the second processing means is operable to compare said first value data to said second value data and to trigger the alarm in the event that the first value data is not reconciled with the second value data.

5. A system according to claim 3, wherein the second processing means is operable to compare said first value data to said second value data and to control said RF means to delete the first value data from the RFID device in the event that the first value data is reconciled with the second value data.

6. A system according to claim 3, comprising display means for displaying the information stored in a database to a user.

7. A packaging system for packaging a stack of sheet object that bare an attributable monetary value a container, comprising: (i) a packaging device, comprising: means for determining first value data relating to a sheet object to be stacked in the container and an RF reader/writer for writing said first value data to an RFID device: (ii) at least one container configured to be filled with a stack of sheet objects by the packaging device; (iii) a reusable RFID device disposable within the container: (iv) an non-reusable closure member for providing a one-time seal for the container to confine the stack of sheet, objects and the RFID device; (v) an unpackaging device for removing sheet objects from the container and the container determining second value data relating to sheet objects removed from the container; and (vi) an RIFD detector for detecting the RFID device, wherein the RF detector is operable to write tracking information to the RFID device.

8. A system according to claim 7, further comprising a first processing means having a first database for storing said first value data therein, wherein the RF detector is operable to transmit said tracking information to the first processing means, and the first processing means is operable to store said tracking information in the first database in association with the first value data.

9. A system according to claim 7, further comprising a second processing means having a second database for storing the first value data read from the RFID device and the second value data determined by the unpacking device, wherein the RF detector is operable to transmit said tracking information to the second processing means, and the second processing means is operable to store said tracking information in the second database in association with the first value data.

10. A system according to claim 7, wherein the tracking information comprises the time and or the date when the RFID device is detected by the RF detector.

11. A method of transporting sheet objects that have an attributable monetary value, the method comprising:

determining first value data relating to a stack of sheet objects packaged in a container;

writing said first value data to an RFID device associated with the container;

storing said first value data in a first database;

sealing the container with a non-reusable permanent closure member to securely confine the stack of sheet objects packed in the container and the RFID device;

unpacking the stack of sheet objects from the container;

determining second value data relating to the stack of sheet objects;

reading the first value data from the RFID device;

removing the RFID device from the container for re-use; and storing said first value data and said second value data in a second database.

12. A method according to claim 11, comprising comparing the first value data with the second value data and triggering an alarm in the event that the first value data is not reconciled with the second value data.

13. A method according to claim 11, comprising comparing the first value data with the second value data and deleting the first value data from the RFID device in the event that the first value data is reconciled with the second value data.

14. A packaging system for packaging a stack of sheet objects that have an attributable monetary value in a container, comprising:

(i) a packaging device, comprising:

means for determining first value data relating to a sheet object to be stacked in the container and an RF reader for reading identification information from an RFID device associated with a container;

(ii) at least one container configured to be filled with a stack of sheet objects by the packaging device;

(iii) a reusable RFID device disposable in the container;

(iv) at least one non-reusable closure member for providing a one-time seal to confine the stack of sheet objects and the RFID device;

(v) first processing means having a first database for storing identification information read from the RFID device in association with said first value data; and (vi) an unpacking device for removing sheet objects from the container and determining second value data relating to sheet objects removed from the container.

15. A system according to claim 14, wherein the unpacking device comprises RF means for reading the identification information stored on the RFID device.

16. A system according to claim 15, comprising second processing means having a second database for storing the identification information read from the RFID device in association with the second value data determined by the unpacking device.

17. A system according to claim 16, comprising display means for displaying information stored in the second database to a user.

18. A system according to claim 16, wherein said second processing means is operable to send, across a network, a request signal to said first processing means, said request signal relating to the identification information read from the RFID device.

19. A system according to claim 18, wherein the first processing means is operable to transmit data stored in the first database in association with the identification information, across a network, to the second processing means in response to receiving said request signal.

20. A system according to claim 19, wherein the second processing means is operable to store data received from the first processing means in the second database in association with the identification information read from the RFID device.

21. A method of transporting sheet objects that have an attributable monetary value, the method comprising:

determining first value data relating to a stack of sheet objects packaged in a container;

reading identification information from a reusable RFID device associated with the container;

storing said identification information in a first database in association with said first value data;

sealing the RFID device inside the container with a non-reusable permanent closure member to provide a one-time seal to securely confine the RFID and the sheet objects until a new opening is broken into the container;

sensing the RFID device within a predetermined locality;

reading the identification information stored on the RFID device;

storing tracking information on the first database in association with the identification information;

unpacking the stack of sheet objects from the container;

determining second value data relating to the stack of sheet objects;

reading the identification information from the RFID device;

retrieving first value data associated with the identification information read from the RFID device from the first database; and storing said first value data and said second value data in a second database in association with the identification information read from the RFID device.

22. A method according to claim 21, comprising:

comparing said first value data with said second value data; and triggering an alarm in the event that the first value data is not reconciled with the second value data.

23. A method according to claim 22, comprising:

comparing said first value data with said second value data; and deleting, from the first and/or the second database, data associated with the identification information read from the RFID device, in the event that the first value data is reconciled with the second value data.

* * * * *